ated Nov. 1, 1977

United States Patent [19]
Schoettle et al.

[11] 4,056,245
[45] Nov. 1, 1977

[54] MAGNETIC TAPE CARTRIDGE

[75] Inventors: Klaus Schoettle, Heidelberg; Heinrich Wittkamp, Mannheim; Lothar Gliniorz, Frankenthal, all of Germany

[73] Assignee: BASF Aktiengesellschaft, Ludwigshafen, Germany

[21] Appl. No.: 637,780

[22] Filed: Dec. 4, 1975

[30] Foreign Application Priority Data

Dec. 7, 1974  Germany .............................. 7440820
Mar. 21, 1975  Germany .............................. 2512455

[51] Int. Cl.² ........................................... G11B 23/02
[52] U.S. Cl. ..................................... 242/197; 360/132
[58] Field of Search .............. 242/55, 19 A, 197–200; 352/72–78 R; 360/93, 96, 132; 220/246, 264, 4 B, 4 E, 323; 206/387, 389; 197/151; 16/72, 73, 180–182

[56] References Cited

U.S. PATENT DOCUMENTS

| 1,860,131 | 5/1932 | Booth | 200/264 |
| 2,541,377 | 2/1951 | Neely | 16/182 |
| 3,788,576 | 1/1974 | Buslik | 242/199 |

Primary Examiner—Leonard D. Christian
Attorney, Agent, or Firm—Keil, Thompson & Shurtleff

[57] ABSTRACT

A magnetic tape cartridge consisting essentially of two hollow boxes which are connected together, by means of a closing spring, with their single open sides facing each other so as to be pivotable in one plane, a closing force being exerted upon said hollow boxes by said spring. This magnetic tape cartridge is suitable for all applications where cartridge halves must be frequently pivoted relative to one another, while being economical to manufacture.

4 Claims, 8 Drawing Figures

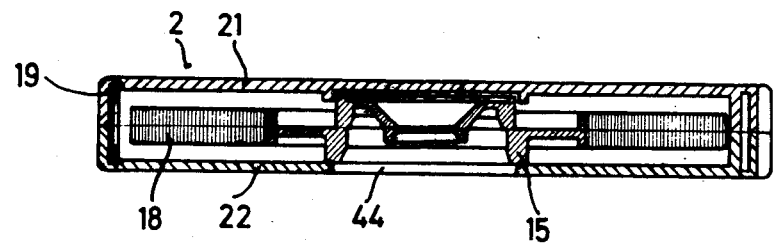
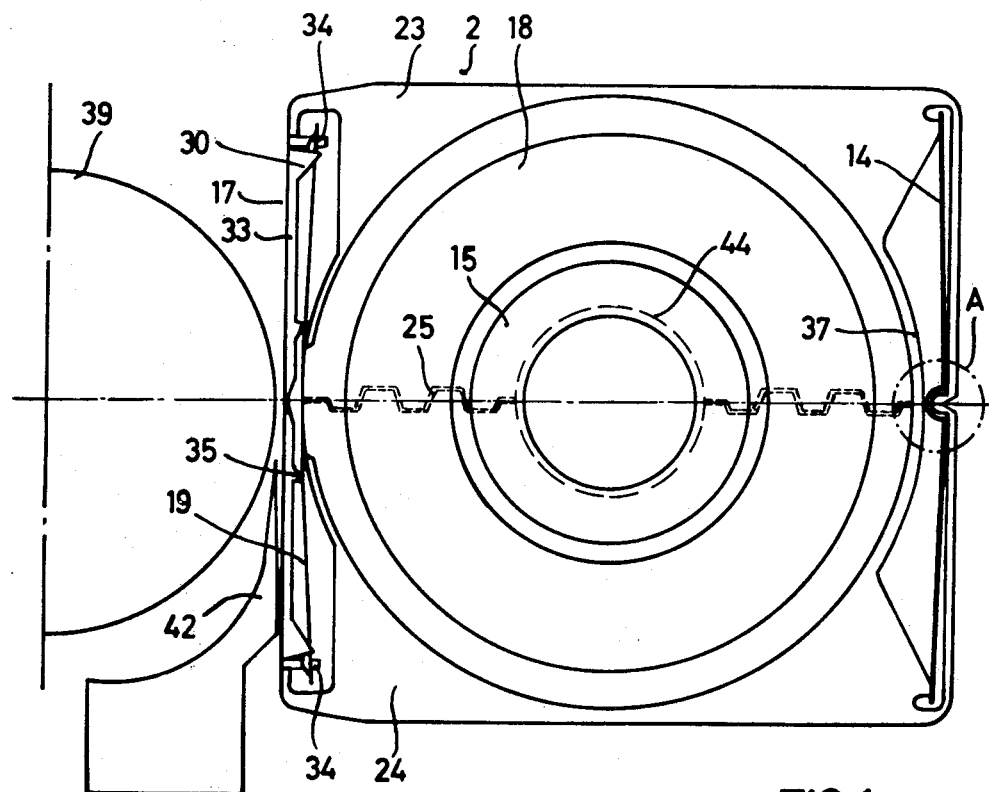

MAGNETIC TAPE CARTRIDGE

A magnetic tape cartridge, consisting of a housing formed by two flat hollow boxes of about the same size and volume which are connected together, by spring means, with their single open sides facing each other so as to be pivotable in one plane, such that in the closed position of the cartridge the hollow boxes completely enclose the roll of tape, a closing force being exerted by the spring means upon the hollow boxes, whereas in the open position of the cartridge the hollow boxes are pivoted apart relative to one another and the open sides oppose one another at an angle in the pivoting plane, the opening angle being limited by stop means in such a way that part of the peripheral surface of the roll of tape is exposed between the hollow boxes.

A magnetic tape cartridge of the type referred to has been described in U.S. application Ser. No. 533,177, filed on Dec. 16, 1974 by the present applicant now U.S. Pat. No. 3,987,489 dated Oct. 19, 1976. This cartridge has, as connecting means for the cartridge halves, a hinge and a closing spring, the latter being inserted symmetrically with respect to the hinge in both halves of the cartridge housing. Since the cartridge, when in the operating position on appropriate apparatus, is opened in that the halves of the housing are caused to pivot apart by means of, and at the same time as, a loading mechanism which can be swung apart, it is necessary for the pivot of the hinge to be situated directly above the pivot of the loading mechanism, since opening of the cartridge without stressing it would not otherwise be possible. The inevitably large tolerances in a mass-produced cartridge and a mass-produced loading mechanism make compliance with this requirement problematical. As a result, in use the cartridge housing frequently fractures in the hinge region.

It is therefore the object of the present invention to provide an improved cartridge which is reliable in operation.

This object is achieved according to the invention by a magnetic tape cartridge consisting of a housing formed by two flat hollow boxes of about the same size and volume which are connected together, by spring means, with their single open sides facing each other so as to be pivotable in one plane, such that in the closed position of the cartridge the hollow boxes completely enclose the roll of tape, a closing force being exerted upon the hollow boxes by the spring means, whereas in the open position of the cartridge the hollow boxes are pivoted apart relative to one another and the open sides oppose one another at an angle in the pivoting plane, the opening angle being limited by stop means in such a way that only part of the peripheral surface of the tape roll is exposed between the hollow boxes, wherein the spring means is formed by a single two-armed closing spring which serves as the only hinge means, is arranged adjacent to the rear wall of the cartridge and determines the position of the theoretical pivoting axis, one of the arms of the closing spring being connected to one of the hollow boxes and the other arm to the other hollow box and the length of the closing spring corresponding substantially to the length of the rear wall of the cartridge, so that a maximum closing force can act upon the hollow boxes.

The cartridge design of the invention offers the following advantages:

a. The housing parts are simple to mass-produce in view of the fact that the cartridge halves are identical in shape.

b. Pivoting operations over long periods do not affect the operational reliability of the cartridge.

c. The cartridge halves can be connected together simply by inserting the closing spring which also acts as hinge means.

In an advantageous embodiment of the invention, the closing spring comprises a central portion embracing parts of the hollow boxes, which central portion at the same time forms the pivoting axis for the hollow boxes.

In a further embodiment of the invention, the closing spring is a leaf spring which is fitted to the hollow boxes in a position in which it can exert the closing force. By locating the leaf spring in a position perpendicular to the horizontal plane of the cartridge, additional strength is imparted to the cartridge, especially in the closed position, thus enabling the cartridge to resist flexural stresses.

In another advantageous embodiment of the invention, the central portion of the closing spring is $\Omega$-shaped in plan view, and the parts of the hollow box which are embraced by this portion of the spring constitute in each case a projection on the side wall of each hollow box, said projection restricting the opening in the hollow box at one of its narrow sides.

This spring design enables the housing parts to be manufactured without difficulty.

In yet another advantageous embodiment of the cartridge of the invention, the closing spring is non-slidably secured to the hollow boxes at the ends of its arms only, in a position such that the pivoting axis lies substantially within the spring.

Further details of an embodiment of the invention will now be described with reference to the accompanying drawings, in which FIG. 1 is a plan view which shows a cartridge according to the invention, in the closed position on a transport apparatus;

FIG. 2 is a sectional view taken along lines II—II of the cartridge of the invention of FIG. 1;

Figure 5:
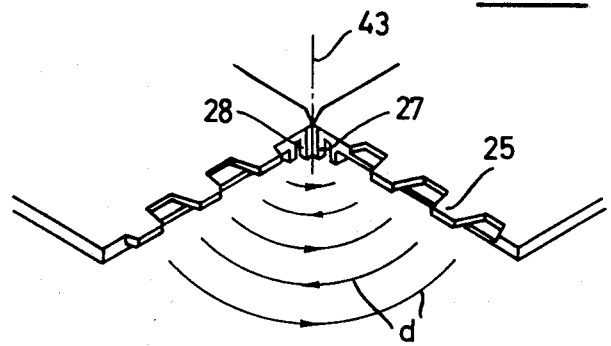
FIG. 5 is a detail of the teeth of the cartridge halves.
Figure 8:
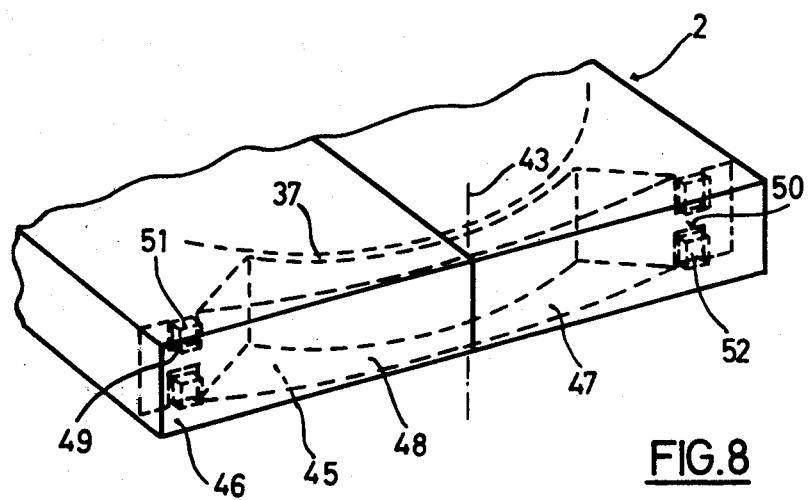
FIG. 8 shows a detail of another cartridge design in perspective view.
Figure 7:
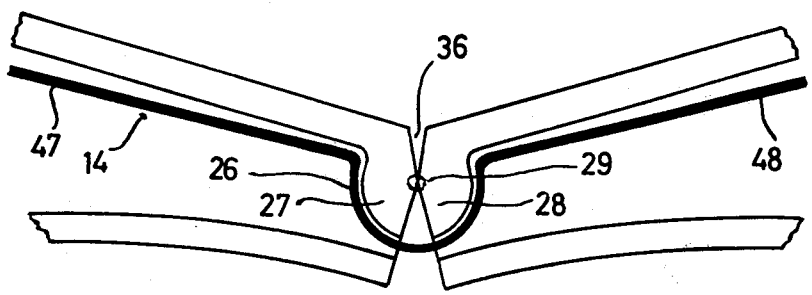
FIG. 7 shows detail B of the cartridge of FIG. 3.
Figure 6:
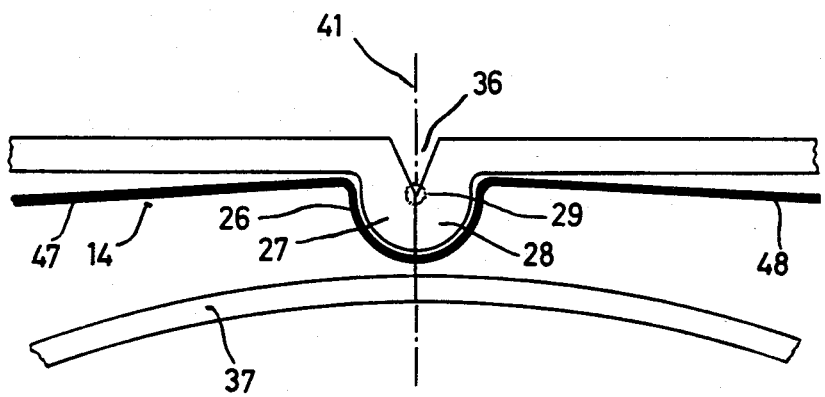
FIG. 6 shows detail A of the cartridge of FIG. 1.

The cartridge 2 is a single-reel cartridge. The magnetic tape is wound on a hub 15, which is preferably made of aluminum, to form roll 18. At its periphery, the roll 18 is provided with a leader tape for threading purposes which holds itself to the edges of the outer turns of tape by means of lateral teeth, so that the roll 18 is held together and the outer turns of tape cannot slip off the roll. When the cartridge 2 is closed (cf. FIG. 1) the hub 15 is held between upper and lower walls 21 and 22 of the cartridge 2 by means of ribs (not shown) in such a way that it is prevented from rotating and being displaced vertically and radially when the cartridge is handled. An additional feature for preventing rotation of the roll 18 may consist of toothed elements (not shown) on the lower side of the hub 15 which engage matching recesses in or projections on the lower wall 22 of the cartridge. The cartridge 2 is composed of two unilaterally open hollow substantially right parallelepipedic boxes of the same size constituting cartridge parts 23, 24 which are pivotally connected to one another by connecting means still to be described in greater detail. In an advantageous embodiment of the invention, the cartridge parts 23 and 24 each consist of two simple injection moldings made of plastics material, connected to one another in a suitable manner, for example by ultrasonic welding or by screws. The cartridge parts 23 and 24 completely enclose the tape roll 18 when the cartridge 2 is closed, so that there is no direct access to the tape from the outside at any point. The tape roll 18 is thus afforded optimum protection against mechanical damage and dust. Where the two cartridge parts 23 and 24 meet, portions of the lower and upper surfaces 22 and 21 over- and underlap, forming interlocking teeth 25 (see arrows $d$ in FIG. 5) which bring about an increase in the mechanical strength of the cartridge 2 in the plane of separation 41, make the cartridge virtually dust tight and improve protection of the tape and the tape pack 18 against mechanical damage. Other interlocking arrangements may also be used, for example, a tongue-and-groove connection. An additional safeguard against bending of the cartridge 2 in the plane of separation consists of a first and a second spring. The first spring 14 acts as the closing spring. Advantageously, it is a leaf spring, and its ends may be held in a suitable position in the two cartridge parts 23 and 24. The arrangement and shape of the spring 14 in the drawing make it clear that a force which causes the teeth 25 to firmly interlock is exerted on the cartridge parts 23 and 24. In the illustrated embodiment of the spring 14, an $\Omega$-shaped central portion 26 embraces the projections 27 and 28 on the housing which together have a substantially semicircular outline, the pivoting point 29 (the point at which the pivoting axis 43 passes perpendicularly through the plane of the drawing) of the cartridge parts 23, 24 substantially coinciding with the center of the circle. The projections 27, 28 point inwardly toward the front wall 17. To simplify manufacture, both cartridge parts are preferably of symmetrical and indentical shape. In the closed position of the cartridge 2 (FIG. 6), the projections 27, 28 form an angular gap 36 which is symmetrical to the plane of separation 41 and extends outwardly from the pivoting point 29, the angle of this gap determining the desired opening angle, e.g. 30°. The cartridge can thus be opened without the $\Omega$-shaped central portion 26 of the spring 14 being elongated. The spring cannot move toward the middle of the cartridge beyond a certain point, owing to the inside cylindrical wall which delimits the space for the pack; only part 37 of this wall is shown in the drawings. The play with which the $\Omega$-shaped central portion 26 embraces the projections 27 and 28 on the cartridge parts 23 and 24, and the resilience of the said central portion compensate for tolerances in the pivoting points of the cartridge 2 and the loading mechanism which is not shown here but is described in the aforementioned U.S. patent application. The width of the spring is only slightly less than the inside height of the housing. Due to the very small amount of play and to the length of the spring arms, the cartridge parts 23, 24 are held in the same horizontal plane. By means of its arms, the spring 14 produces a closing torque in the two lateral regions of the cartridge 2, which torque manifests itself as the closing force at the teeth 25. Another embodiment of the cartridge of the invention is shown in FIG. 8.

Figure 4:
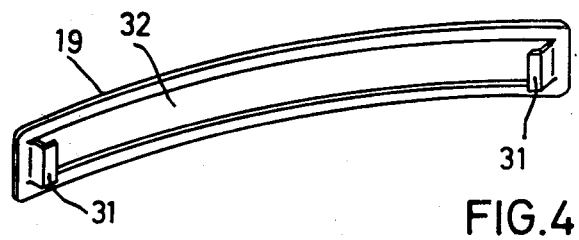
FIG. 4 is a plan view which shows a closing spring of the cartridge.

The second spring 18 will be referred to hereinafter as the "frontal spring", of which one embodiment is shown in FIG. 4. When the cartridge 2 is in the closed position, the frontal spring 19 engages the wedge-shaped projections 30, the latter cooperating with an aperture 32 in the frontal spring near the edges 31. The steeply inclined sides of the projections 30, which face the side walls 33 of the cartridge, constitute a simple means of compensating for slight differences in length of the frontal spring 19 and/or housing tolerances which occur during manufacture. The rectangular opening 32 in the frontal spring 19 is so dimensioned that at least part of the tape roll 18 can pass therethrough without the turns of the tape pack or the leader tape being touched. The provision of angled projections 31 on the frontal spring 19 makes it possible to so design the projections 30, 35 on the inside of the front wall 17 of the housing that they extend over the entire inside height of the cartridge, which is a great advantage from the injection-molding point of view. The frontal spring 19 in the relaxed state is slightly bowed, so that it bears against the inside of the front wall 17 after it has been fitted in the cartridge, a further retaining force being therefore applied to the teeth 25 when the cartridge 2 is in the closed position. In order to open the cartridge 2, transport apparatus-associated projections pass through the apertures or slots 34 in the front wall of the cartridge opposite the ends of the frontal spring 19, so that the latter are bent back and thus lifted clear of the projections 30. If the cartridge parts 23 and 24 are now swung apart as described, smaller projections 35 engage the angled projections 31 of the spring 19, thus limiting the opening angle. The wedge shape of the projections 30 enables the curved ends of the frontal spring 19 to readily slide up and over the projections when the cartridge is closed.

As can be seen from FIGS. 1 and 2, the springs 14 and 19 are confined so narrowly over their entire length inside the cartridge 2 that even slight bending or warping of the cartridge in the plane of separation 41 of the cartridge parts 23 and 24 causes the springs 14 and 19 to bear against the inner surfaces of the lower and upper cartridge walls, sufficiently strong resistance thus opposing any further bending or warping.

The spring 19 may also be designed in any other suitable manner, for example it may be in the form of a rectangular loop of wire. It is not absolutely necessary to provide an aperture in the frontal spring 19; an elongated, substantially U-shaped spring member would also be sufficient. The frontal spring 19 can be readily inserted subsequently in the otherwise complete cartridge 2, the housing parts of which have for example already been screwed together. Using special tools, it is also possible to remove the frontal spring 19, for example, in order to replace it, to exchange the tape roll 18 or to repair the cartridge.

Figure 3:
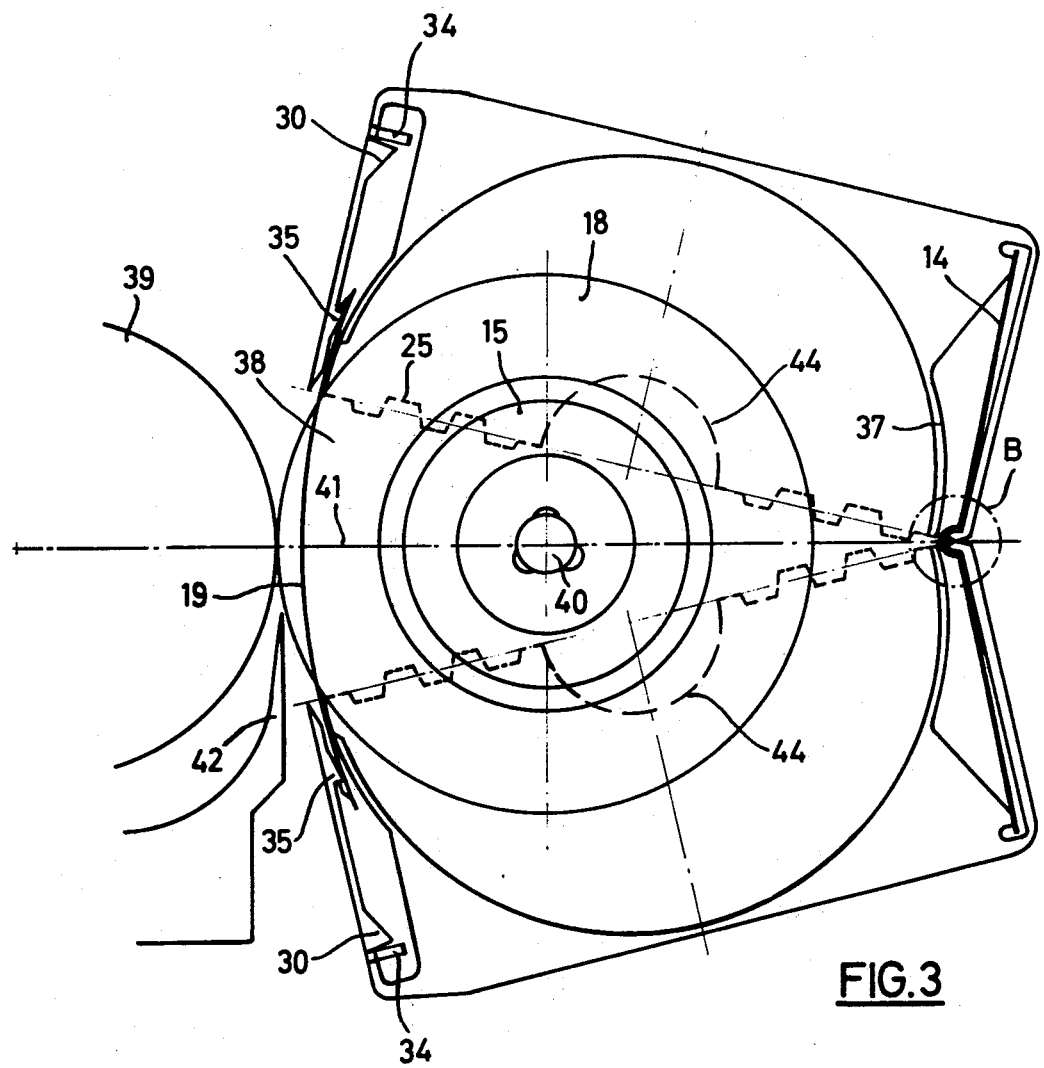
FIG. 3 is a plan view which shows the cartridge of FIG. 1 in the open position, the roll of tape being driven by the transport apparatus.

A comparison of the positions of the tape roll 18 in FIGS. 1 and 3 shows that the roll 18 in the latter drawing has already been pushed out of the aperture 38 and has reached a position in which it makes contact with the peripheral surface of a transport apparatus-associated drive member 39 (shown diagrammatically in the form of a semicircle) which drives two tape packs in a transport apparatus operating on the contact-winding principle. In transport apparatus of this type, in order to maintain adequate compressive forces between the drive member — which will be referred to hereinafter as the "capstan" — and the tape packs, it is necessary for the packs to advance and retreat relative to the capstan during feeding of the tape to take the decreasing and increasing pack diameters into account. In an apparatus of this type, the shafts carrying the tape packs are advantageously so mounted that they can be radially displaced via springs toward and away from the capstan.

The shaft 40 which carries the hub 15 is mounted in the described manner so as to be displaceable along the central axis 41 of the cartridge toward the capstan 39. The hub 15 is thus displaced within the sector between the cartridge parts 23 and 24 via the shaft 40. The pack 18 is a full tape pack from which the leading end of a leader tape is peeled by means of a peeling blade 42. The leader tape is then guided around the capstan 39 by guide means not shown here and fastens itself to a second hub to commence the formation of a take-up roll (not shown), the tape being scanned by scanning means (not shown), as it is fed from the supply roll to the take-up roll. The leader tape is made of a plastics film which is usually thicker than the magnetic tape itself and is spliced to the latter by known means. The cartridge design ensures that the leader tape inside the cartridge 2 cannot detach itself from the pack particularly if springs, not shown here, are employed which hold the turns of the pack together. The distance between the periphery of the roll of tape and the inside cylindrical wall of the cartridge is advantageously such that the leader tape remains in contact with the periphery of the pack. Similarly, the other spaces between the pack and cartridge parts are so dimensioned that the leader tape cannot jam in the cartridge or detach itself from the pack when the pack is inadvertently turned in the opposite direction, even if the end of the leader tape is standing slightly away from the periphery of the pack.

Detachment of the leader tape from the pack prior to threading on the transport apparatus would give rise to disturbances in predominantly automatic threading operations. After the magnetic tape has been completely unwound, the empty hub 15 bears against the periphery of the capstan. Rewinding of the magnetic tape from the take-up roll onto hub 15 of the cartridge 2 can then be effected until the maximum pack daimeter has been achieved.

A further embodiment of the cartride 2 of the invention is shown diagrammatically in FIG. 8. In this embodiment, a leaf spring 45 is provided inside the cartridge adjacent to the rear wall 46 of the cartridge. Here, only the ends of the spring arms 47 and 48 are connected to the cartridge, in contrast to the above-described spring. Appropriately shaped and positioned holding members 51, 52 on the cartridge housing engage substantially rectangular apertures 49, 50 in the spring arms. The spring thus holds the hollow elements 23, 34 together and, at the same time, forms the hinge, no additional means being necessary. The pivoting axis 43 preferably lies within the spring 45 itself (see FIG. 8). The pivoting axis 43 may however also lie in front of, or behind, the spring if the play for the spring at this point is sufficiently large.

Referring to the embodiments described above, it will be seen that the most important advantages of the cartridge according to the invention and the transport apparatus for use therewith are that, owing to the design of the cartridge, the tape pack, before the cartridge is placed in position on the apparatus, is effectively protected against all external influences such as dust, dirt and mechanical damage, that operation of the cartridge, after it has been placed in position on the apparatus, is both reliable and largely automatic without there being any risk of the cartridge or the transport apparatus being damaged and that the cartridge as well as the components of the receiving means for the cartridge can be mass-produced easily and economically. Another important advantage over the state of the art is that the cartridge is firmly locked on the transport apparatus and only the roll of tape is displaced. The simple design of the cartridge and its simple mode of operation on the transport apparatus makes a simple and cheap loading mechanism possible.

Notwithstanding the above-described embodiments of the invention, the cartridge described here can also be produced without aperture 44 for the admission of a spindle or shaft. Nor is it necessary for the width of the magnetic tape to be less than the pack diameter. Further embodiments of the cartridge are conceivable within the scope of the claims, which embodiments are also claimed.

We claim:

1. A cartridge assembly for storing a roll of magnetic recording tape, said assembly comprising:
    an enclosure housing consisting of a pair of pivotal hollow boxes having corresponding open sides;
    a pair of inward projections formed on the rear wall of said hollow boxes about which said hollow boxes pivot;
    a spring means for hinging said hollow boxes together along their corresponding open sides and for urging said hollow boxes together in a normally closed position;
    said spring means comprising a two-armed closing spring, a portion of one of said arms engaging one of said hollow boxes and a portion of the other of said arms engaging the other of said hollow boxes;
    said spring means further having a central portion which embraces said projections formed on the rear wall of said hollow boxes thereby keeping them bearing against each other as said hollow boxes are pivoted open.

2. A cartridge assembly according to claim 1 wherein said central portion of said closing spring has an $\Omega$ shape in plan view.

3. A cartridge assembly according to claim 1 wherein said hollow boxes have an indentation formed therein near their pivot point which allows execution of a pivoting movement.

4. A cartridge assembly according to claim 3 wherein said hollow boxes have tapered portions formed therein near their pivot point which bear upon one another when said hollow boxes are pivoted to their desired maximum open position.

* * * * *